Nov. 28, 1950   F. H. SMITH ET AL   2,531,952
BATTERY VENTING APPARATUS
Filed Sept. 15, 1943   3 Sheets-Sheet 1

INVENTORS
FREDERICK H. SMITH
PIERCE G. COUPERUS
BY
ATTORNEY

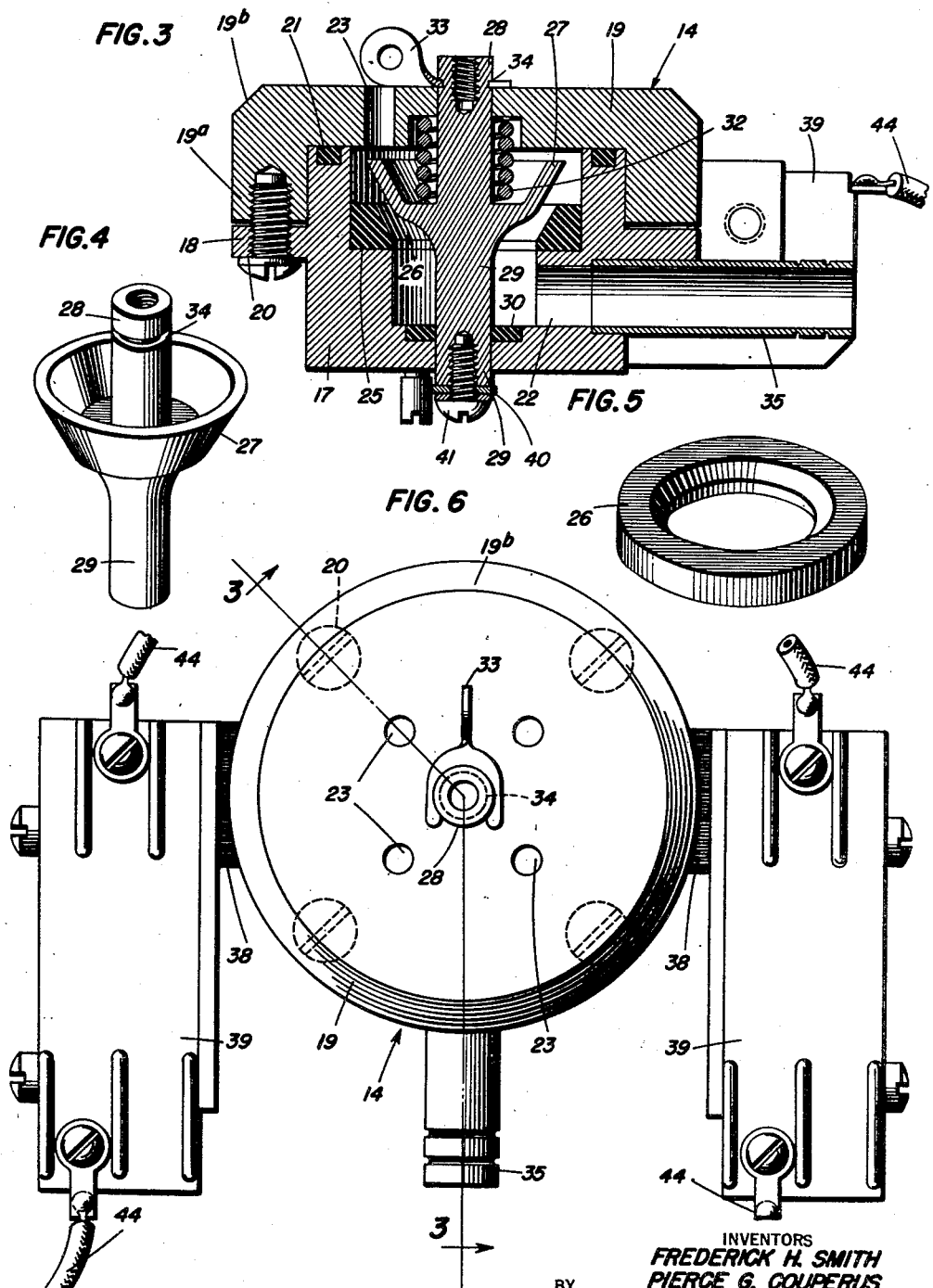

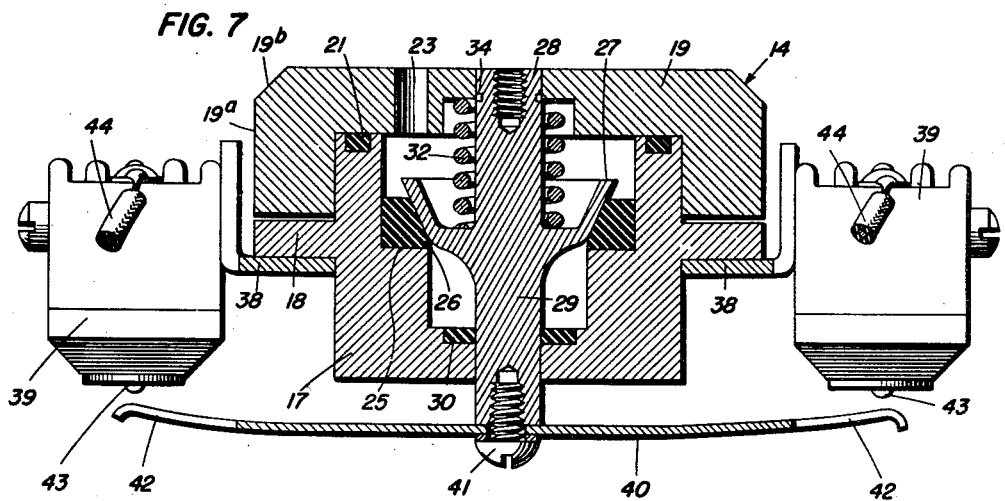
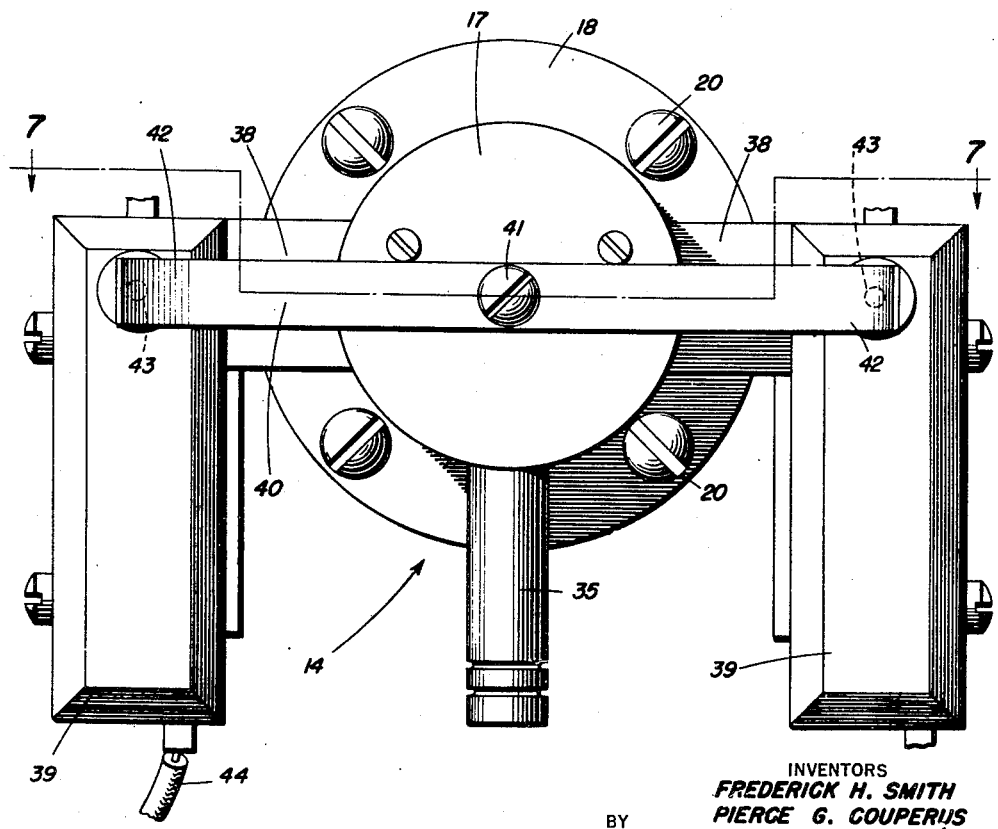

Patented Nov. 28, 1950

2,531,952

UNITED STATES PATENT OFFICE 2,531,952

BATTERY VENTING APPARATUS

Frederick H. Smith and Pierce G. Couperus, East Natick, Mass., assignors to the United States of America as represented by the Secretary of the Navy Application September 15, 1943, Serial No. 502,522

1 Claim. (Cl. 114—20)

This invention relates to venting apparatus for use in underwater apparatus of the electrically operable type which includes a chargeable battery. More particularly, the invention is concerned with a novel valve for this use which vents the battery while it is being charged and before the apparatus is launched and which is operable to seal the battery when the apparatus is launched, so as to prevent water from reaching the battery through the vent. The new valve is simple and compact in construction and positive in operation.

Certain types of torpedoes and other underwater apparatus are operable electrically by a storage battery in the hull which is charged prior to launching the apparatus, so that the battery is adapted to deliver the required voltage. During the charging operation, which may be performed while the apparatus is being transported to the launching area, hydrogen gas is produced in the battery, and it is necessary to vent this gas to the atmosphere to prevent accumulation of the gas in the hull and possible accidental explosion. However, when the charging operation is terminated and the apparatus is launched, it is necessary to cut off the battery from the vent in order to prevent water from flowing to the battery through the vent and damaging the battery.

One object of the present invention, therefore, resides in the provision of a novel venting apparatus for venting the battery before the torpedo or other underwater apparatus is launched and which is operable, preferably automatically upon release of the torpedo, to seal the battery from the vent and thereby prevent water from reaching the battery after the torpedo is launched.

Another object of the invention is to provide a venting apparatus of the character described which includes a valve mounted in a casing, and a latch normally holding the valve open against a spring to permit escape of gas from the battery through the casing, the latch being releasable to cause the spring to close the valve and thereby seal the vent from the battery.

Still another object of the invention resides in the provision of a venting apparatus of the character described having an arming switch operable under control of the battery vent valve.

These and other objects of the invention may be better understood by reference to the accompanying drawings, in which—

Fig. 3 is a transverse sectional view of the arming device, taken on the line 3—3 in Fig. 6, with the valve in its open position;

Figs. 4 and 5 are perspective views of the valve member and the valve seat, respectively;

Fig. 6 is a plan view of the arming device;

Fig. 7 is a transverse sectional view of the arming device, taken on the line 7—7 in Fig. 8, showing the valve in its closed position, and Fig. 8 is a bottom view of the arming device.

Figure 1:
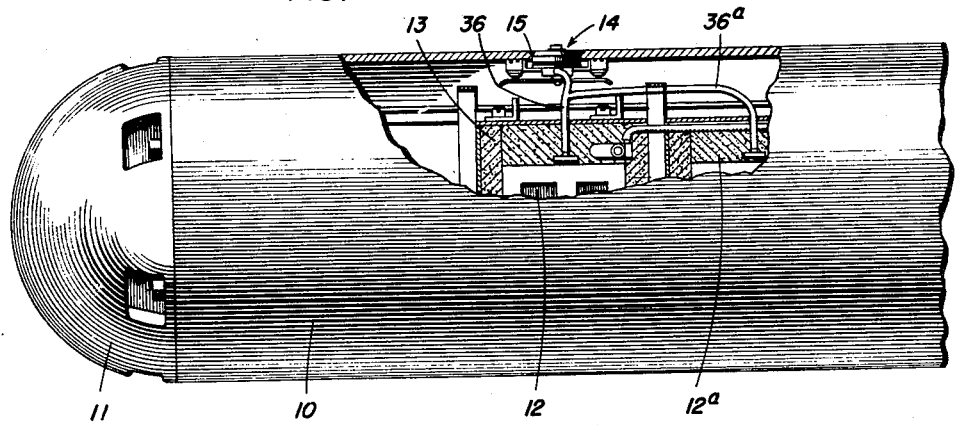
Fig. 1 is a view in side elevation of a torpedo employing one form of the new arming device, with part of the torpedo hull broken away to shown the arming device.
Figure 2:
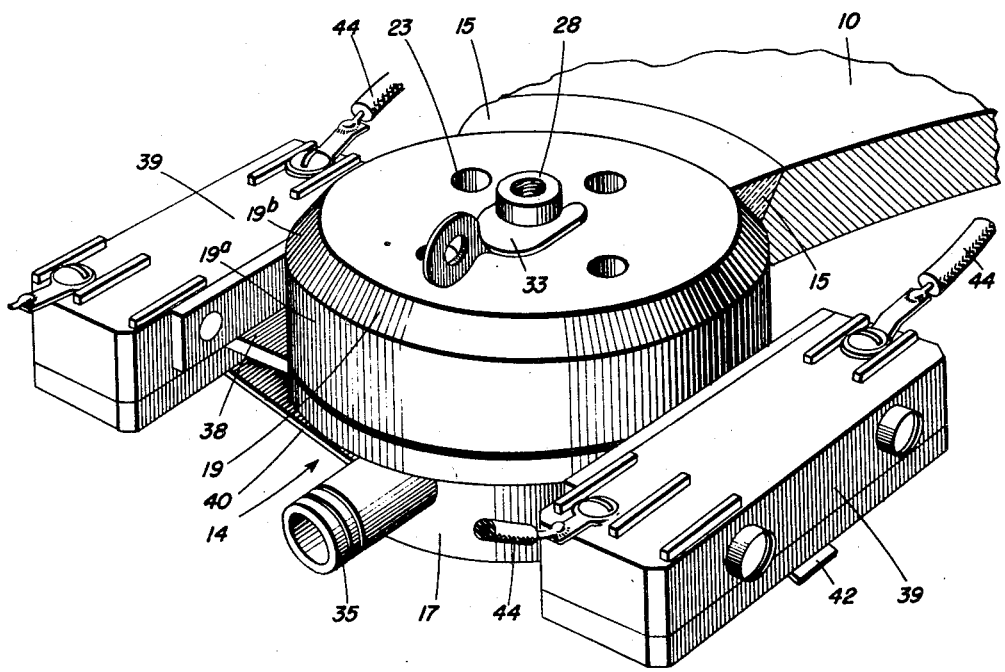
Fig. 2 is an enlarged perspective view of the arming device shown in Fig. 1.

The venting apparatus of our invention may be used in electrically controlled underwater apparatus of various types, such as torpedoes and mines. For illustrative purposes, we have disclosed the device in a form suitable for use in an electrically controlled torpedo having a hull comprising a main section 10 and a head 11. The main section 10 contains a pair of storage batteries 12, 12a which are preferably encased in padding 13 so that the torpedo may be launched from an airplane without injury to the batteries due to the impact when the torpedo strikes the water. The batteries are of the rechargeable type and are adapted to supply current to an automatic steering system (not shown) in the torpedo. The venting apparatus of our invention is shown generally at 14 and is mounted in an opening in the top of the hull section 10, the venting apparatus being secured in the opening in any suitable manner, as by means of welding 15.

The venting apparatus 14 comprises a generally cup-shaped casing 17 having an external flange 18 intermediate its ends. The casing is provided with a cover 19 secured over the open end of the casing by screws 20 extending through the flange 18 and threaded into an apron 19a on the cover. The upper edge of the cover is bevelled, as shown at 19b, to provide a recess for receiving the welding 15 in the top of the hull. A gasket 21 is seated in the upper end of casing 17 and is engaged by the cover 19 to seal the interior of the casing. Near its lower end, the casing has an inlet port 22, and the cover plate 19 is provided with a plurality of outlet ports 23.

A shoulder 25 in the casing supports an annular valve seat 26 between the inlet and outlet ports 22, 23. The valve seat 26 has a generally conical opening which flares outwardly toward the cover plate 19, the conical surface of the opening being engageable by a conical valve member 27 to cut off the flow of fluid through the casing. Extending upwardly from the valve 27 is a valve stem 28 which projects through a central opening in the cover 19. A similar valve stem 29 extends downwardly from the valve through an opening in the bottom of casing 17, the stem being surrounded by a sealing washer 30 seated in the bottom wall of the casing.

The valve 27 is urged toward its seat 26 by a compression spring 32 coiled around the stem 28 and seated at one end in a recess in cover 19 and at the other end on the valve. However, the valve is normally held in an open position against spring 32 by a releaseable latch 33 outside the casing. As shown, the latch 33 is in the form of a fork having its tines engaged in an annular groove 34 in the outer end portion of the stem 28, the tines lying flat against the top of cover 19. The fork 33 may form part of a release mechanism (not shown) for the torpedo so that it is automatically withdrawn from groove 34 when the torpedo is launched, whereby the spring 32 snaps the valve to its closed position against seat 26.

The inlet port 22 is enlarged at its outer end to receive a pipe stem 35 which is connected by flexible tubing 36 and 36a to the chambers of batteries 12 and 12a, respectively.

On opposite sides of casing 17 are brackets 38 which extend outwardly from the casing and serve to support arming switches 39. The switches 39 are controlled by the valve 27 through a crossarm 40 connected intermediate its ends to the outer end of valve stem 29, as by means of a screw 41. Each end portion 42 of the crossarm is disposed opposite an actuating button 43 on one of the switches 39, and when the valve is latched in its open position the crossarm engages the buttons 43 and holds the switches open. The switches are connected in the operating circuits of the electrical control system through suitable wiring 44.

In operation, when the torpedo is being transported by an airplane or other vehicle, the storage batteries 12 and 12a may be charge from a suitable apparatus (not shown) in the airplane, and hydrogen formed in the batteries escapes through the tubing 36, 36a, the open valve 26—27, and outlet ports 23, to the atmosphere. By thus venting the batteries to the atmosphere, any accumulation of hydrogen in the torpedo, with its attendant danger, is prevented. It will be apparent that while the torpedo is being transported, the latch 33 holds the valve open and also holds the arming switches 39 open, through crossarm 40, against the action of spring 32. When the torpedo is launched, the latch 33 is withdrawn from groove 34, and the spring 32 seats the valve and moves crossarm 40 out of engagement with the switch buttons 33. As a result, the arming switches are closed to energize the control circuits, and the valve 27 is seated to seal the batteries from the outlet ports 23. Accordingly, when the torpedo enters the water, the valve 27 prevents water from reaching the batteries through the ports 23. Since the valve is disposed on the outlet side of its seat 26, the pressure of water entering the casing through ports 23 acts to supplement the force of spring 32 and hold the valve firmly on its seat.

The new valve is of compact and rugged construction and is positive in operation. By arranging the valve stem 28 to fit closely and slide in the stationary cover 19, we provide against the entrance of foreign matter, such as pieces of wood, into the casing and resulting jamming of the valve in its open position and flooding of the batteries.

We claim:

In an electrically operable underwater ordance having a hull containing a chargeable battery, a venting apparatus therefor comprising a casing having an outlet port communicating with the exterior of the hull and also having an inlet port communicating with the battery, a valve seat in the casing between said ports, a valve in the casing engageable with the seat, a spring urging the valve toward the seat, releasable means outside the hull normally holding the valve away from the seat against the spring to allow gas from the battery to escape through the seat and the outlet port, said last means being releasable when the ordnance is launched to cause the spring to close the valve and prevent water from entering the battery from the outlet port.

FREDERICK H. SMITH.
PIERCE G. COUPERUS.

REFERENCES CITED

The following references are of record in the file of this patent:

UNITED STATES PATENTS

| Number | Name | Date |
| --- | --- | --- |
| 900,260 | Boyd | Oct. 6, 1908 |
| 1,452,055 | Stokes | Apr. 17, 1923 |
| 1,756,072 | Smith | Apr. 29, 1930 |
| 1,765,027 | Mitchell | June 17, 1930 |
| 1,911,286 | Palmieri | May 30, 1933 |

FOREIGN PATENTS

| Number | Country | Date |
| --- | --- | --- |
| 78 | Great Britain | A. D. 1912 |